Sept. 2, 1941.    H. S. THOMAS    2,254,953
SEWAGE DISPOSAL SYSTEM AND APPARATUS THEREFOR
Filed Sept. 14, 1937
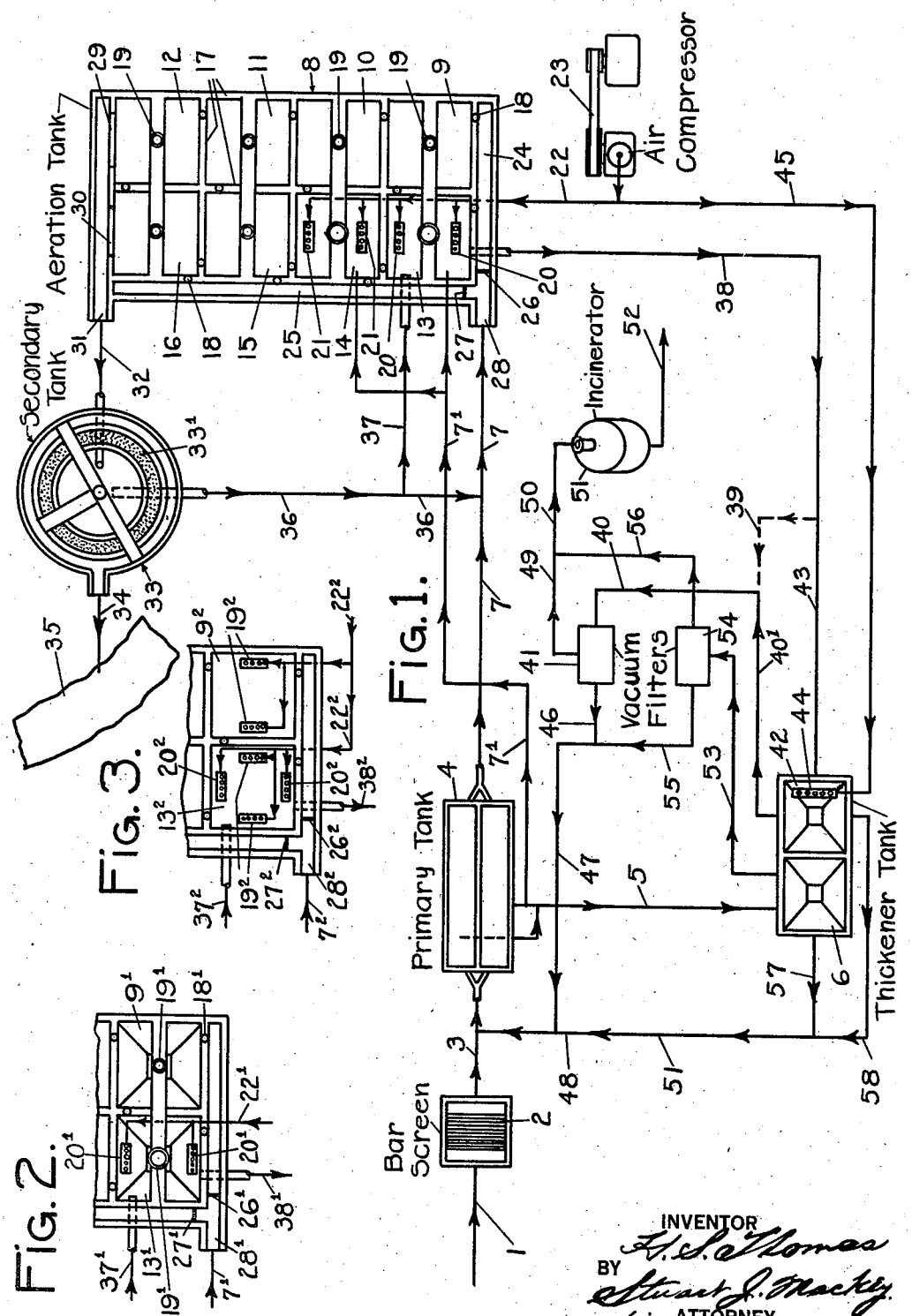
INVENTOR
H. S. Thomas
BY Stuart J. Mackey
his ATTORNEY Patented Sept. 2, 1941

2,254,953

UNITED STATES PATENT OFFICE 2,254,953

SEWAGE DISPOSAL SYSTEM AND APPARATUS THEREFOR

Howard S. Thomas, Rochester, N. Y.

Application September 14, 1937, Serial No. 163,804

11 Claims. (Cl. 210—8)

This invention relates, in general, to a sewage disposal system, and to apparatus therefor; and has more particular reference to improvements in a system of the activated sludge type and to apparatus therefor.

In the disposal of sewage it is of course of greatest importance to dispose of the sewage in as economical a manner as is possible, consistent with safety to health and freedom from nuisance.

In the type of system to which this invention relates, that is, the activated sludge type, the usual procedure is roughly as follows. The raw sewage, after passing through a coarse filter, is conducted into a primary settling tank, where it may remain for perhaps an hour, during which time the easily settleable solids fall to the tank bottom and can be removed therefrom. These solids, known as primary sludge, can be stored and kept in a harmless state, by the use of lime, or the like, until the time for final disposal of the same.

The remaining portion of the sewage is passed into an aeration tank, where it is supplied with air to thus furnish sufficient oxygen to promote the aerobic bacterial action which breaks the solid matters down into more easily separable, and less complex and harmful, solids, in the usual manner common to this process, as well known by those skilled in this particular art.

After treatment in the aeration tank varying, in accordance with conditions, but perhaps of about six hours in duration, the sewage is passed to a secondary settling tank where the more liquid part is decanted off, and can be discharged into a stream, or the like, without danger to health, while the solids, contained in a thick solution, constitute the activated sludge. This activated sludge, in the absence of a sufficient supply of oxygen, is very putrescible, and rapidly becomes very noxious and dangerous, and hence, if not immediately used, must ordinarily be promptly finally disposed of.

Part of the activated sludge handled is employed to seed the raw sewage entering the aeration tank, in order to promote the necessary bacterial action, and hence the major part of the activated sludge handled is returned to the inlet of the aeration tank as returned activated sludge. That part, however, which is not so returned, and known as excess activated sludge, must be promptly cared for in some suitable manner as, for example, in a digester, where the usual digestion process is carried out over the course of several months, or by spreading it out over the ground in the usual broad irrigation treatment. If the excess sludge be first digested, it is generally ultimately disposed of either by incineration or by broad irrigation.

It can be appreciated from the above that where land is scarce, or at a premium, or where the population is dense, or both, it is economically impractical to employ broad irrigation.

It can also be appreciated that the usual digestion process, as understood in this art, is relatively expensive, and should, if possible, be avoided, in the interest of economy.

In view of the above and in accordance with the present invention, it is proposed to dispose of the excess activated sludge in a novel and most desirable manner, by first safely storing this excess activated sludge and allowing it to accumulate for several days or even weeks, before final disposal.

Since the activated sludge rapidly becomes noxious and putrescible, it is proposed, during the storage period, to supply it with sufficient oxygen to continue the aerobic bacterial action sufficiently to keep the sludge in a healthy condition, and also, when necessary, to supply it with sufficient nitrogenous matter to feed upon.

More specifically, it is proposed to employ a section of the usual aeration tank, which may, or may not, be isolated from the remaining portion, as a storage tank for excess activated sludge, and, while the usual aeration process is being carried out, return the excess activated sludge, as it is produced, to this storage tank and there supply it with sufficient air to maintain it in a healthful condition, and nitrogenous matter as needed.

When sufficient excess activated sludge has been stored to make it economical to finally dispose of the same, this stored activated sludge, and the raw primary sludge which has meanwhile been accumulating and treated as stated above, is filtered to reduce the water content, the filtrate being returned to the primary tank while the solids, constituting the filter cake, are passed to the incinerator where they are finally disposed of.

By treating the sludge as above briefly indicated, several distinct advantages are realized in the disposal of sewage.

In the case of a disposal plant, treating, for example, a million gallons of sewage per day, the amount of solids to be disposed of is relatively small and a commercially practical incinerator will have a capacity sufficient to dispose of the solids per day, in the course of a few hours. Accordingly, if the sludge were disposed of as it is produced, the incinerator would be operated each day for but a few hours a day, and due to the necessary heating up period, the process would be far from economical. By accumulating the sludge, and storing it until a sufficient quantity exists to permit continuous operation of the incinerator for possibly several days at a time, great economies can be realized.

A further advantage of this new system arises from the fact that the incoming sewage varies in character from time to time and hence requires more or less returned activated sludge to properly seed it. With the excess activated sludge stored up as contemplated by this invention, there can always be a sufficient supply of activated sludge available for seeding the incoming sewage, regardless of the temperature or the concentration of the sewage. If the excess sludge were disposed of currently, there would be times when there might well be insufficient activated sludge to properly seed the incoming sewage.

A further advantage of this invention resides in the resulting flexibility of operation of the system which is possible. If the excess activated sludge were disposed of as it accumulates, any break down in the apparatus, and particularly in the incinerator, would result in an accumulation of sludge with no means for keeping it healthy meantime with the possibility of greatly endangering health and causing a nuisance. With the proposed system, however, the excess sludge can be incinerated at frequent intervals in accordance with conditions, and variations of one or two days in the intervals between operations of the incinerator can easily be tolerated, and hence give time for repairing break downs. Were it not for this new process, it would be essential to employ standby or replacement units to care for such emergencies.

It can be thus seen that a system in accordance with the present invention, and as briefly outlined above, results in economy, flexibility and reliability of operation, such as has not heretofore been realized.

Further objects, purposes and characteristic features of the present invention will appear as the description progresses, reference being made to the accompanying figures of drawing showing, in a wholly diagrammatic manner, and in no way in a limiting sense, one form which the invention can assume.

In the drawing:

Fig. 1 is a diagrammatic representation of one form of apparatus operable in accordance with the present invention.

Fig. 2 is a modified form of apparatus.

Fig. 3 is a second modified form of apparatus.

Referring now to the drawing, and first to Fig. 1, incoming raw sewage is passed through a pipe 1, to a bar screen 2, whereby the larger portions of sticks, stones, paper and the like, will be removed, and can be suitably disposed of in any usual manner. From screen 2, the sewage is conducted through a pipe 3, to the primary tanks 4, here shown as two in number, and wherein the usual treatment takes place, resulting in the more readily settleable solids falling to the tank bottom and being separated out as the primary raw sludge and being passed out through a pipe 5, to a thickener tank 6, there to be stored to await final disposal, and meanwhile being maintained in a healthy condition, by means of lime, or by any other usual and suitable treatment.

The overflow, or the more liquid portions, from the primary tanks, are passed through a pipe 7 to the aeration tank 8.

The aeration tank, as shown, is comprised of eight separate compartments designated as 9, 10, 11, 12, 13, 14, 15 and 16, and are formed by side and center walls 17. Suitable valves 18 are supplied in the various walls, whereby to permit intercommunicating the separate tanks so that flow can take place in desirable fashions in ccordance with the varying conditions encountered, and all in accordance with usual practice. Each separate compartment is supplied with a mechanical aerator 19, of the down draft type, for supplying air to the sewage in the compartment whereby to promote the desired aerobic bacterial action, characteristic of the usual activated sludge process, in accordance with established principles.

In each of the two compartments 13 and 14, one or both of which can be used for storage, the mechanical aerator is of larger size than in the other compartments, for purposes to be later explained. Also, in each of these two tanks, there are provided bottom auxiliary aerators 20, 20 and 21, 21, respectively, supplied, through an air line 22, from an air compressor 23, whereby to supply the additional oxygen required for continuing the aerobic activity in the stored and thickened excess activated sludge by the recognized diffused air method.

The aeration tank has two inlet channels 24 and 25, communicating through shut-off baffles 26 and 27, with an inlet chamber 28, into which the sewage from pipe 7 is conducted. The outflowing sewage from the aeration tank is passed over one, or both, of two weirs 29 and 30, in the two end compartments 12 and 16, and then into an outlet channel 31, from whence it is passed through a pipe 32, to the secondary settling tank 33.

The sewage passing into secondary tank 33 is treated in the usual manner, to settle out as much of the solids as possible, and to produce as much of a clear innocous effluent as is consistent with economical operation. This effluent is the filtrate from suitable filters, 33$^1$, such as magnetic filters, with the filtrate being passed out through a pipe 34, into a stream 35, or any other suitable place for disposal of this relatively pure and innocuous liquid.

The major portion of the solids from the secondary tank is passed out through a pipe 36, and constitutes the activated sludge, as produced in this process. This sludge is employed to reseed the raw sewage entering the aeration tank, although a small percentage of the activated sludge handled is not needed for mixing with the incoming raw sewage, and in fact, cannot be so used, and constitutes the excess activated sludge, which is passed through a pipe 37, to the aeration tank compartment 13, where it is stored until final disposal is economical.

While the excess activated sludge is being stored, an increasing amount of oxygen is necessary for promoting the desired bacterial action, necessary to maintain the stored excess activated sludge in a healthful condition, and this may at times, be partly, or wholly supplied, in the form of air, by the bottom aerators 20, and nitrogen, as primary sludge, through 7$^1$.

The valves 18, in the walls of the tank compartments can be positioned to isolate compartment 13 from the rest of the tank, at suitable times, so that it can be employed for storage of the excess activated sludge. The valves in the other compartments can be so positioned as to permit a suitable flow of the raw sewage through the various compartments so as to effect a sufficient bacterial action prior to its exit through the outlet pipe 32 as to facilitate the subsequent treatment of the sewage. The speed of flow, and the direction of flow, through tank 8, can vary in accordance with conditions and requirements, all in accordance with established principles well known in this art, and the flow can be produced by gravity, or by a suitable pumping system, or otherwise, in accordance with usual practice.

If it be desired to have additional storage capacity for excess activated sludge, another compartment, as 14, can be so employed, with any additional required oxygen supplied by the bottom aerators 21. In general, as many of the compartments can be reserved for storage purposes as is necessary, consistent with the contemporaneous production of activated sludge, with such compartments supplied by auxiliary bottom aerators for properly supplying additional oxygen to the stored excess activated sludge.

When it is economical to finally dispose of the stored excess activated sludge, it can be conveyed through pipes 38, 39 and 40, directly to a vacuum filter 41, or it can first be conveyed to a thickener tank 42, through pipes 38 and 43, for furnishing additional storage space for excess activated sludge. In the latter event, additional oxygen is supplied through a bottom aerator 44 supplied through a pipe 45, with air from the compressor 23.

In either event, that is, whether or not part of the excess activated sludge is first stored in the thickener tank 42, or is directly passed to the vacuum filter 41, the excess activated sludge, through 40¹ and 40 if from the tank 42, and after being suitably treated with ferric chloride or the like, at the filter location, is filtered, and the filtrate returned through pipes 46, 47 and 48, to pipe 3 leading into the primary tanks. The relatively solid portions, or filter cake, are conveyed, as at 49 and 50, to an incinerator 51, in which it is consumed, the ashes being passed out at 52, to be disposed of in any suitable manner, such as a fertilizer, or the like.

While the stored excess activated sludge is being filtered in vacuum filter 41, the stored up raw primary sludge, from thickener tank 6, is passed through a pipe 53, to a vacuum filter 54, with the filtrate being passed through pipes 55, 47, 48 and 3, into the primary tanks. The filter cake, from filter 54, is conveyed, as at 56, and 50, to the incinerator 51, there to be disposed of, as above.

Supernatant liquid, from the tops of tanks 6 and 42, can be drawn off through pipes 57 and 58 respectively, and through pipes 51, 48 and 3, and to the primary tanks.

In the form of apparatus just described, the mechanical down draft aerators 19, are of the type which draws the liquid, together with entrained air, inwardly along the surface of the liquid, to the center of the surface, then downwardly to the bottom of the compartment, and then outwardly along the bottom, whereby to produce a circulation toward the center at the surface of the liquid, and from the center at the bottom of the compartment. With this type of mechanical aerator, the bottom aerators, such as 20 in compartment 13, placed at the sides of the compartment, produce an upward and outward flow of the liquid in the same general manner as the mechanical aerator produces. Accordingly, the mechanical down draft aerator, and the bottom aerators, can be operating at the same time.

The mechanical aerators for the compartments to be used for storage, such as compartments 13 and 14, are of a larger capacity than those for the other compartments and which are to be employed solely for producing the activated sludge, and hence can be of a capacity such as, for example, 5 H. P. each, as compared to the aerators in the other compartments, such as compartment 9, of perhaps 3 H. P. each. With this arrangement, when auxiliary air is necessary to maintain the stored excess activated sludge in a healthful condition, so long as the liquid level is proper for the functioning of the mechanical aerators, this additional air can be largely, or wholly, supplied by these oversized mechanical aerators. If still more air be required than the mechanical aerators can supply, the bottom aerators can be employed in conjunction therewith, although it is desirable to supply the total amount of air necessary, by means of the mechanical aerators, if possible, since these aerators are more economical in operation than the bottom aerators.

Referring now to Fig. 2 of the drawing, a modified form of apparatus is here shown, with the parts corresponding to like parts in Fig. 1, being designated by like reference characters, with distinctive exponents. In this form, the essential differences from the form of Fig. 1, are the hopper bottom compartments and the mechanical surface aerators 19¹. These aerators are of the up draft type and tend to produce a circulation just the reverse in direction of that produced by the down draft type of Fig. 1. In other words, these aerators cause a circulation of the liquid upwardly at the center of the compartment, outward along the surface, then downwardly, and finally inwardly along the bottom of the compartment. This circulation is just opposite in direction to what is caused by the bottom aerators 20¹, and thus, in this form, the two types of aerators in the storage compartments, such as compartment 13¹, cannot be operated to advantage at the same time.

Here again, the mechanical surface aerator for the storage compartment 13¹, is of a larger size than that for the other compartments, such as 9¹, and for the same reasons as set forth above in connection with the form of Fig. 1.

Referring now to Fig. 3, a second modified form of the invention is shown, with the parts corresponding with like parts of Fig. 1 designated by like reference characters with distinctive exponents.

In this form of the invention, the supply of air for producing the activated sludge, is supplied by bottom aerators, thus employing the recognized diffused air type of system, as shown in connection with compartment 9² wherein two bottom aerators 19² are employed with an air supply to them by way of air lines 22².

In compartment 13², to be employed for storage of excess activated sludge, in addition to two bottom aerators 19², there are two auxiliary bottom aerators 20² for supplying the additional air required by the stored sludge.

To briefly summarize the air supply features in the aeration tanks of the three forms of invention disclosed above, the following can be noted.

In the form of Fig. 1, where sludge producing mechanical down draft aerators are employed, the auxiliary air necessary can at times be supplied by bottom aerators of the diffused air type, and these two types of aerators in the storage compartments can be operated at the same time.

In the form of Fig. 2, that is, with sludge producing mechanical surface aerators of the up draft type, and with bottom aerators in the storage compartments; the two kinds of aerators cannot be operated economically in conjunction with each other, and accordingly should not be operated at the same time.

In the form of Fig. 3, where the diffused air method is employed to the exclusion of any others, the auxiliary bottom aerators can of course, when needed, be operated in conjunction with the usual sludge producing bottom aerators.

The various pieces of apparatus described above, can be of any usual or standard form, the essential feature of the process involved in this invention being the storage of the excess activated sludge for a period of days or even weeks before its filtering and incineration, and the essential feature of the apparatus here involved being the furnishing of auxiliary bottom aerators, in an isolatable compartment of the aeration tank and in the thickener tank 40; whereby to make for the various advantages disclosed.

It is well recognized in this art that activated sludge becomes very unhealthy and dangerous in the course of only a few hours if not properly supplied with oxygen, and hence storage for any length of time without suitable means for supplying auxiliary oxygen, would be quite out of the question.

With sewage disposal plants, as above described, the systems can be operated in various manners, in accordance with surrounding conditions.

Merely as one example of one operative cycle, and of the quantities involved, it may be helpful to consider the proposed plant at Greece, New York, which plant is now under construction.

In the plant under consideration, 10,000 people are to be served and it can be assumed that the sewage to be treated will be 1,000,000 G. P. D., with about 300 P. P. M. of dry solids, and 90% removable, which, at 8.33 lbs. per gallon, gives 2250 lbs. of dry solids to be disposed of each day.

It can be assumed that the primary settling tanks, which have a total capacity of 53,000 gals., and which therefore will retain the sewage on an average of perhaps one hour, will separate out one-half of the total removable solids, or 1125 lbs. of dry solids, at about 94% moisture, thus producing 1125/.06 (1/8.33) or 2250 gals., of primary raw sludge per day.

With this 2250 gals., deducted from the total sewage flow per day, for simplicity it can be considered that still approximately one million gals., of raw sewage is to be passed into the aeration tank each day, and containing the remaining removable solids, or 1125 lbs. of dry solids. This sewage, assuming that all of these solids appear in the activated sludge, and that the activated sludge is approximately 98% moisture, will thus produce daily $1125 \times 50/8.33 = 6750$ gals., of activated sludge produced per day.

The required returned activated sludge varies widely in quantity, from time to time, depending upon temperature, condition of the incoming sewage, etc., and while it may run from 4% up to 50%, by volume, of the incoming raw sewage, it can be assumed to approximate, on the average, about 20% by volume of the incoming sewage. Thus, 200,000 gals., of activated sludge is to be returned to mix with the incoming sewage each day, so that about 1,200,000 gals., of mixture will pass per day through the aeration tank. With one of the aeration tank compartments reserved for storage, after the system has been fully instituted, this leaves seven compartments, each with a capacity of 53,000 gals., for the activated sludge process, so that the material passing through the aeration tank will average about 7 hours in this tank, and each day will result in 206,750 gals., of activated sludge passing out from the secondary settling tank; 200,000 gals. of which is returned activated sludge and the remainder, or 6,750 gals., is the excess activated sludge, which is to be stored.

With one of the aeration tank compartments, having a capacity of 53,000 gals., used for storage, there is sufficient storage space to care for about 8 days production, and since the quantity of returned activated sludge varies at different times, some times running over 20% of the incoming sewage, the excess may be at times considerably less than the above 6,750 gals., per day, so that it is contemplated that there will be storage capacity for excess activated sludge for about 10 days.

From the above it can be seen that on the average, the returned activated sludge comprises about 96.7% of the total activated sludge handled per day with the excess activated sludge amounting to only 3.3% of the total activated sludge handled per day. The remainder of the volume of sewage, not accounted for above, and amounting to approximately 993,250 gals., passes out of the system as relatively sterile effluent from the secondary settling tank, this effluent being the filtrate from the magnetite, or other suitable filters.

When the plant is first cut into operation, with all of the apparatus empty, each day 1,000,000 gals., of sewage enters the plant. The activated sludge produced from the sewage is all returned to the incoming sewage as returned activated sludge, and this is continued until a quantity of activated sludge has been accumulated which is sufficient to properly seed the incoming sewage.

In the example set forth above, at the beginning of the operation of the plant, all of the eight compartments of the aeration tank will be employed for the production of activated sludge, and since about 6,750 gals., of activated sludge is produced per day, it will require approximately 30 days to accuumlate the 200,000 gals., of activated sludge required. During these 30 days, the sewage in the eight compartments of the aeration tank, will progressively become thicker and thicker and increase in volume, and contain an increasing percentage of solids, but all compartments will contain the same type of sewage, and the rate of travel through the tank will be increased so as to maintain the liquid level practically constant.

After having accumulated activated sludge to the extent of 200,000 gals., in the course of approximately 30 days, the next day will produce excess activated sludge to the extent of about 6,750 gals., which must be handled in some suitable manner. The procedure from this point onward may take various forms, and merely by way of example, there will be pointed out a preferred procedure, and an alternative procedure.

*Preferred procedure.*—In this procedure, on the 31st day, for example, after the plant has been cut into operation, all of the excess activated sludge, amounting on the average to 6,750 gals., as it is separated out, will be passed into storage compartment 13 while passing the same number of gallons, and preferably at the same rate, of material out of this compartment and into the sewage passing through the other seven compartments. The storage compartment 13, then functioning primarily as a place for storage of activated sludge, and not, as with the other compartments, a place for the production of activated sludge.

Each day the excess activated sludge is passed into this storage compartment 13 and an equal quantity of material is passed out of this compartment and into the activated sludge producing system. This is a continuous type of process, and accordingly, as time goes on, the storage compartment will contain heavier and heavier sludge until, after from 8 to 10 days, it will be filled with excess activated sludge at about 98% moisture, as compared to the material in the other seven compartments which will have a moisture content of perhaps 99.8%.

After a period of storage, varying according to conditions, but which can be assumed, by way of example, to be about five days, the stored activated sludge will have exhausted the nitrogen in the sewage in the storage tank, and thence will require additional food for the bacteria. This can be supplied in various forms; as for instance, raw sewage, but better, in more concentrated form, as primary sludge.

Accordingly, on the assumption that about 200 gals. of primary sludge will feed, for one day, the bacteria in one day's production of excess activated sludge; on the 6th day of storage, primary sludge to the amount of 1200 gals. is passed through pipe 7¹, to the stored sludge. Thus, if the storage continues for 10 days, primary sludge in increasing quantity is added; i. e., for the last 4 days, in gals., 1400, 1600, 1800 and 2000.

Of course, the bacteria of the stored activated sludge, can be fed in any other suitable manner, the main requirement being that the stored activated sludge be properly oxygenated and nourished, so that it will be in proper condition to be readily filtered.

During this process of storage of the excess activated sludge, by passing as large a quanitity out of the storage compartment as that which enters it, the liquid level is maintained substantially constant, and is maintained substantially the same as that of the other seven compartments. In these circumstances, it can be seen that the down draft mechanical aerators, in all of the compartments, can be operated efficiently, it being a characteristic of these mechanical aerators, that they can function properly only when the liquid surface is at a level within certain limits.

Accordingly, in this form of the invention, the down draft mechanical aerator of extra capacity in the storage compartment, is employed to supply all of the air necessary for maintaining the stored sludge in a healthful condition. If more air is necessary than can be supplied by the mechanical aerator, the bottom aerators in this compartment can be used simultaneously with the mechanical aerator, although it is not contemplated that the use of the bottom aerators will be required at this stage of the process.

When the storage compartment is approximately full of excess activated sludge, and it is economical to filter this sludge and dispose of it by incineration, it will be passed to the filter and the level of liquid in this compartment will be drawn down until the compartment is empty, and this, as set forth below, will take several days, during which time the liquid level is not suitable for operation of the mechanical aerator. Accordingly, during this part of the process, that is, while the liquid level is being drawn down for filtering, the bottom aerators are employed to supply diffused air for maintaining the decreasing stored activated sludge in a healthful condition.

After the storage compartment, such as 13, has been completely emptied, the cycle is repeated, starting, as at the 31st day, with all eight compartments containing material of the same density and storing excess activated sludge in the one compartment 13 to gradually bring its density up to the density of the excess activated sludge.

Thus, in the process contemplated to be carried out in apparatus as disclosed in Fig. 1, during the first 30 days, while the body of 200,000 gals., of activated sludge is being accumulated, the quantity of sewage passing through the aeration tank per day increases from 1,000,000 gals., to 1,200,000 gals., and the time for passage through the aeration tank is gradually decreased during these 30 days, and in a corresponding degree, so as to maintain the liquid level in all of the compartments at substantially a constant figure.

Accordingly, during the approximately 30 day period for bringing the plant up to the normal operating cycle, the liquid level is maintained substantially constant. Then, during the subsequent recurring 8 to 10 day cycles of storage, the liquid level in all of the compartments is maintained substantially constant and meanwhile the density of the material in the storage compartment gradually increases from the starting figure of 99.8% moisture to the usual figure of 98.0% moisture, which is the density of the activated sludge separated out by the secondary tank.

By employing an operative cycle as just described, a very large percentage of the total air required for the stored sludge can be supplied in a very economical fashion by down draft mechanical aerators, and thus make for very considerable economies in operation.

*Alternative procedure.*—In an alternative procedure which might be carried out, after the first 30 days of operation, during which the required returned activated sludge, in the amount of 200,000 gals., is produced, the storage cycle can be varied, by completely emptying the storage compartment 13, into the other compartments, and then storing the excess activated sludge in this storage compartment while the storage compartment is completely isolated from the rest of the aeration tank, meanwhile supplying necessary air to the stored sludge by means of bottom aeration. When the storage compartment is full, the stored sludge can be disposed of as before.

In this method of procedure, which might at times be desirable for the sake of simplicity, the liquid level in the storage compartment varies widely from day to day, and very little of the air necessary for the stored activated sludge can be supplied by the mechanical down draft aerator. Accordingly, it is not contemplated that this operative cycle will be very generally employed, despite its simplicity. Nitrogenous matter, as described above, is to be added to the stored activated sludge, but starting earlier in the storage period, possibly the first day, and at least the second or third.

Considering the "Preferred procedure," outlined above, in connection with the forms of apparatus shown in Figs. 2 and 3, it can be seen in connection with Fig. 2, that the mechanical up draft surface aerator in the storage compartment 13¹, must be of a sufficient capacity to supply all the air necessary for storage during the storage period of 8 to 10 days. In this form, the bottom aerators cannot be operated with the mechanical aerator, as explained above, and accordingly, the bottom aerators will be employed only during the time when the stored sludge is being drawn off to the vacuum filter and the liquid level is being rapidly drawn down.

With the mechanical surface aerator as used in Fig. 2 however, it being of the up draft type, the liquid level is not so critical in controlling the operation of the aerator, and accordingly, this mechanical aerator might be employed during the first part of the time when the liquid level is being drawn down during the filtering process.

Considering now the form shown in Fig. 3, since the aeration for the activated sludge treatment and for supplying auxiliary air for storage purposes, is of the same type; the bottom aerators can, and must, be employed at all stages of the process, it merely being necessary to supply sufficient air to maintain the thickening stored excess activated sludge in a healthful condition.

Considering now the "Alternative procedure," and in connection with the forms of Figs. 2 and 3, it can be appreciated that during the 8 to 10 day cycle for storage of excess activated sludge, air for keeping the stored material healthful, must be largely supplied by bottom aeration in the Fig. 2 form because of the limiting factor of the liquid level on the mechanical surface aerator, and, of course, must necessarily be so supplied in the Fig. 3 form, because this is the only type of aerator there employed.

Thus, in the continuously operated system, on the average, 2250 lbs. of removable dry solids enter the system per day, and 2250 lbs. of dry solids leave the system per day. Of this, about one-half, or 1125 lbs. of dry solids, appears in the raw sludge from the primary tank, and the other half, or 1125 lbs. of dry solids, appears in the stored up excess activated sludge.

The primary raw sludge and the excess activated sludge, are filtered separately, by vacuum filters, to produce a filter cake of about 80% moisture, thus producing at the rate, per day, of about 5 tons of solids at about 80% moisture, which is to be disposed of by incineration.

The incinerator, operating continuously for 24 hours, has a capacity of approximately 15 tons of solids, at 80% moisture, whereby, if the solid materials were to be disposed of every day, the incinerator would operate, roughly, for but 8 hours per day, which would be very wasteful.

By operating continuously, the incinerator can consume three days' output, per day, and during each day, one day's output has accumulated, whereby, for every day of operation of the incinerator, there is a final disposal of 2 days' production of solids; i. e., 3−1=2.

Accordingly, if storage be continued for 8 days, and then if the incinerator be operated continuously for 4 days, all solids ready for final disposal will have been used up; great economy in operation has been realized, and furthermore, less objection to the nuisance feature of the incineration, by the surrounding public, will be voiced.

At 80% moisture, and with sludge which has not been digested, there is sufficient fuel value to make the incineration process practically self-sustaining; and if the moisture content can be reduced to 75%, it can be fully self-sustained.

The excess activated sludge can be transferred, from time to time, to the separate thickener tank 42, supplied with the auxiliary bottom aerator 44, to supply additional storage space for excess activated sludge, kept healthy by the additional air. From time to time, supernatant liquid can be withdrawn therefrom, and from tank 6, also, if desirable, through pipes 58 and 57 respectively, to be passed through pipes 51, 48 and 3, to primary tank 4, to thereby concentrate the sludges and increase the available storage capacity. In all events, the stored excess activated sludge is filtered, at 41 and then disposed of in the incinerator 51, as set forth above.

The above rather specific descriptions of several forms of the invention, are given solely by way of example, and are not intended, in any manner whatsoever, in a limiting sense. It is to be understood that all such changes, alterations and modifications in form, and variations in methods of operation, are intended to be covered by this application, as come within the spirit and scope of the invention as defined by the appended claims.

Having disclosed several forms of my invention, I now claim:

1. In a sewage disposal plant of the activated sludge type wherein the excess activated sludge is stored for several days prior to final disposal; in combination with an aeration tank comprising a plurality of separate compartments with means for intercommunicating them at will, means for introducing primary sludge into the aeration tank, a mechanical down draft aerator in each compartment, a final settling tank for separating out the activated sludge, means for conducting activated sludge and clarified liquid from the aeration tank to the settling tank, means for conducting excess activated sludge from the settling tank to at least one of said compartments for storage therein, and a bottom auxiliary aerator in such compartment positioned to aid the circulation caused by the mechanical aerator and supplied with auxiliary air.

2. In a sewage disposal plant of the activated sludge type wherein excess activated sludge is stored for several days prior to disposal by incineration; in combination with an aeration tank comprising a plurality of separate compartments with means for intercommunicating them at will, means for introducing primary sludge into the aeration tank, a mechanical aerator in each compartment, a final settling tank for separating out the activated sludge, means for conducting activated sludge and clarified liquid from the aeration tank to the settling tank, means for conducting excess activated sludge from the settling tank to at least one of said compartments for storage therein, an auxiliary aerator in such compartment and supplied with auxiliary air, an incinerator having a capacity well in excess of the rate of production of the excess activated sludge, and conducting means interconnecting the aeration tank and the incinerator.

3. The improvement in activated sludge sewage disposal processes, comprising, conducting the excess activated sludge, as it is currently produced, to a compartment of the usual aeration tank and storing it therein, supplying the stored sludge with nitrogenous material in quantity sufficient to prevent the sludge from objectionably putrefying, continuing the storage for several days, then filtering the stored sludge and consuming the resulting solids in one continuous operation and at a rate several times in excess of the rate of production of the excess activated sludge.

4. The improved activated sludge sewage disposal process, comprising, conducting and storing the excess activated sludge, as it is produced, to and in one of a plurality of compartments constituting a usual aeration tank, meantime removing the varying resulting sewage and excess activated sludge mixture from said one compartment and adding it to the other tank compartments at substantialy the same rate as the excess sludge is being stored, thus to maintain the level in the storage compartment substantially constant; supplying enough air to the stored sludge, during the storage process, by mechanical aeration, to substantially prevent putrefaction, then isolating the storage compartment from the other compartments and drawing down the level of the stored sludge by removing it at a rate faster than excess activated sludge is being received, while supplying air thereto by air diffusers, and then filtering the removed stored sludge.

5. The improved activated sludge sewage disposal process, comprising, conducting and storing the excess activated sludge, as it is produced, to and in one of a plurality of compartments constituting a usual aeration tank while removing the changing mixture of excess activated sludge and primary sludge sewage from said one compartment and adding to the other aeration tank compartments at substantially the same rate as the excess sludge is being stored; supplying enough air to the stored sludge, during the storage process, by mechanical aeration, to prevent objectionable putrefaction, then isolating the storage compartment from the other compartments, then drawing down the level of the stored sludge by withdrawing it from the compartment at a faster rate than the excess activated sludge is being fed to the compartment while supplying air thereto by air diffusers, filtering the withdrawn stored sludge, and then incinerating the filtered out solids in one continuous process at a rate in excess of the rate of production of excess activated sludge.

6. A storage compartment for storing excess activated sludge including, a tank, a mechanical down draft surface aerator in the tank, and at least one bottom, diffused air, aerator positioned to aid the circulation of sludge as produced by the mechanical aerator.

7. The improved activated sludge sewage disposal process, comprising, conducting and storing the excess activated sludge, as it is produced, to and in one of a plurality of compartments constituting a usual aeration tank, meantime removing the varying resulting sewage and excess activated sludge mixture from said one compartment and adding it to the other tank compartments at substantially the same rate as the excess sludge is being stored, thus to maintain the level of the mixture in the storage compartment substantially constant; supplying enough air to the stored sludge, during the storage process, by mechanical down draft surface aeration and, when air in excess of the capacity of the mechanical aerator is necessary, by diffused air bottom aeration, so as to prevent any substantial putrefaction, then isolating the storage compartment from the other compartments and drawing down the level of the stored sludge by removing it at a rate faster than the excess activated sludge is being received, meantime supplying air thereto by diffused air bottom aeration, and then disposing of the removed stored sludge.

8. The improved activated sludge sewage disposal process, comprising, conducting and storing the excess activated sludge, as it is produced into one of a plurality of compartments constituting a usual aeration tank, meantime removing the varying resulting sewage and excess activated sludge mixture from said one tank compartment and adding it to the other tank compartments at substantially the same rate as the excess sludge is being stored, thus to maintain the level of the mixture in the storage compartment substantially constant and the same as that of the other compartments; supplying enough air to the stored sludge, during the storage process, by up draft mechanical aeration, to prevent objectionable putrefaction, then isolating the storage compartment from the other compartments and drawing down the level of the stored sludge by removing it at a rate faster than the excess activated sludge is being received, while supplying air thereto first by up draft mechanical aeration, and later by diffused air bottom aeration, and then disposing of the removed stored sludge.

9. The improved activated sludge sewage disposal process, comprising, conducting and storing the excess activated sludge, as it is produced, to and in one of a plurality of compartments constituting a usual activated sludge aeration tank, meantime removing the varying resulting sewage and excess activated sludge mixture from said one tank compartment and adding it to the other tank compartments at substantially the same rate as the excess sludge is being stored, thus to maintain the level of the mixture in the storage compartment substantially constant and the same as that in the other compartments; supplying enough air to the stored sludge during the storage process by aeration to prevent objectionable putrefaction, whereby said one compartment gradually changes in its major function from that of an activated sludge aeration unit to that of an excess activated sludge storage unit, then isolating the storage compartment from the other compartments and, while the other compartments are employed for usual aeration, drawing down the level of the stored sludge by removing it at a rate faster than the excess activated sludge is being received, while supplying air thereto, and then finally disposing of the removed stored sludge at a rate faster than it is being received in said one compartment.

10. The improved activated sludge sewage disposal process, comprising, conducting and storing the excess activated sludge, as it is produced, to and in one of a plurality of compartments constituting a usual aeration tank, meantime removing the varying resulting sewage and excess activated sludge mixture from said one compartment and adding it to the other tank compartments at substantially the same rate as the excess sludge is being stored, thus to maintain the level of the mixture in the storage compartment substantially constant; supplying enough nitrogenous matter to the stored sludge during the storage process to prevent objectionable putrefaction, then isolating the storage compartment from the other compartments and drawing down the level of the stored sludge by removing it at a rate faster than excess activated sludge is being received, while supplying nitrogenous matter thereto.

11. The improved activated sludge sewage disposal process, comprising, conducting and storing the excess activated sludge, as it is produced, to and in one of a plurality of compartments constituting a usual aeration tank while removing the changing mixture of excess activated sludge and primary sludge from said one compartment and adding it to the other aeration tank compartments at substantially the same rate as the excess sludge is being stored; supplying enough air to the stored sludge during the storage process to prevent objectionable putrefaction, then isolating the storage compartment from the other compartments, then drawing down the level of the stored sludge by withdrawing it from the compartment at a faster rate than the excess activated sludge is being fed to the compartment while supplying air thereto, filtering the withdrawn stored sludge, and then incinerating the filtered out solids in one continuous process at a rate in excess of the rate of production of excess activated sludge.

HOWARD S. THOMAS.